United States Patent [19]
Bloom

[11] 4,327,966
[45] May 4, 1982

[54] VARIABLE ATTENUATOR FOR LASER RADIATION

[75] Inventor: David M. Bloom, Menlo Park, Calif.

[73] Assignee: Bell Telephone Laboratories, Incorporated, Murray Hill, N.J.

[21] Appl. No.: 124,359

[22] Filed: Feb. 25, 1980

[51] Int. Cl.³ .......................... G02B 5/18; G21K 1/04
[52] U.S. Cl. ................................ 350/162 R; 250/513
[58] Field of Search .................. 350/162 R, 322, 316, 350/271, 272, 273; 250/513, 237 G; 333/81 A

[56] References Cited

U.S. PATENT DOCUMENTS

| | | | |
|---|---|---|---|
| 1,800,044 | 4/1931 | Baird | 350/272 |
| 3,585,121 | 6/1971 | Franks et al. | 350/162 R X |
| 3,603,668 | 9/1971 | DeBitetto | 350/162 R |
| 3,957,354 | 5/1976 | Knop | 350/162 SF |
| 4,009,939 | 3/1977 | Okano | 350/162 SF |
| 4,062,628 | 12/1977 | Gale | 350/162 R |
| 4,093,346 | 6/1978 | Nishino et al. | 350/162 SF |

OTHER PUBLICATIONS

Guild, J., *The Interference Systems of Crossed Diffraction Gratings*, The Clarendon Press, Oxford, 1956, pp. 1-6, 26-47 and 96-98.

Primary Examiner—John K. Corbin
Assistant Examiner—Bruce Y. Arnold
Attorney, Agent, or Firm—Michael B. Einschlag; Daniel D. Dubosky

[57] ABSTRACT

The invention relates to a variable attenuator having two phase gratings (1 and 2) with rectangular grooves. In a first embodiment of the present invention the gratings are slidably mounted (10, 20, 30) so that the gratings have the grooves parallel and the faces in close proximity. As one grating is translated relative to the other the light passing through the device may be varied from total extinction to substantially total transmittance. A single device can be fabricated to provide this attenuation for radiation spanning the visible spectrum. In other embodiments the gratings are fixed relative to one another and the entire device is moved relative to the beam to be attenuated.

7 Claims, 7 Drawing Figures

VARIABLE ATTENUATOR FOR LASER RADIATION

BACKGROUND OF THE INVENTION

The present invention relates to the field of attenuators for laser radiation or radiation from collimated light sources.

Present methods of attenuating radiation utilize materials which are absorbent to radiation from a beam impinging thereon. This approach presents a problem because the absorbent materials are prone to heat damage and variability in their properties with respect to thermal distortions. The materials also deviate the attenuated beam from the direction of the incident beam. A further disadvantage of this approach is that a particular material does not attenuate radiation over large ranges of frequency. Thus, a substitution of materials is required when the frequency of the incident radiation is changed. Lastly, in order to vary the amount of attenuation provided one must alter the amount of material placed in the direction of the incident beam, thereby introducing an additional phase shift.

SUMMARY OF THE INVENTION

A variable attenuator for laser or collimated radiation which solves the problems inherent in the prior art devices is constructed according to the present invention. The variable attenuator has two phase gratings with rectangular grooves disposed in straight parallel lines.

In a first embodiment of the present invention, the gratings are slidably mounted so that the grooves are substantially parallel and the faces are held in close proximity to one another. As one grating is translated relative to the other the radiation passing through the apparatus may be varied from substantially total extinction to substantially total transmittance for a wide range of frequency in the radiation impinging thereon without altering the phase of the transmitted light.

In a second embodiment, the gratings are fixed relative to each other in an assembly so that the grooves make a small angle. The assembly is then moved across the beam to provide for different attenuation at various locations of the assembly.

In a third embodiment, the gratings are fixed relative to each other in an assembly so that the grooves are parallel. However, the periods of the two gratings are slightly different. The assembly is moved across the beam to provide for different attenuation at various locations of the assembly.

BRIEF DESCRIPTION OF THE DRAWING

A complete understanding of the present invention may be gained from a consideration of the detailed discussion presented hereinbelow in connection with the accompanying drawings in which.

DETAILED DESCRIPTION

A variable attenuator for laser radiation or collimated radiation constructed according to the present invention comprises two phase gratings, each one of which has rectangular grooves disposed in parallel lines.

In a first embodiment, the gratings are slidably mounted so that the grooves of one grating are substantially parallel to the grooves of the other grating and the faces of each grating are held in close proximity to one another. The mountings translate the gratings relative to one another in such a manner as to maintain the close proximity of the faces of each grating and the substantially parallel relation of the grooves.

It is not essential that the gratings contact one another, but they should be close enough so that one grating is in the near field of the diffraction from a single rectangular groove of the other grating. If the distance between the gratings is denoted by z and w is the width of a groove, then the closeness requirement is satisfied when $z << w^2/\lambda$ where $\lambda$ is the wavelength of the incident radiation. Furthermore, the light need only to be collimated to the extent that the divergance angle, $\theta$, satisfies the relationship $\theta << \lambda/w$. Note that this requirement essentially states that the divergance angle of the source must be much less than that of the angular separation of diffracted orders. Thus, the finer the grating the larger the acceptance of the attenuator.

Figure 1:
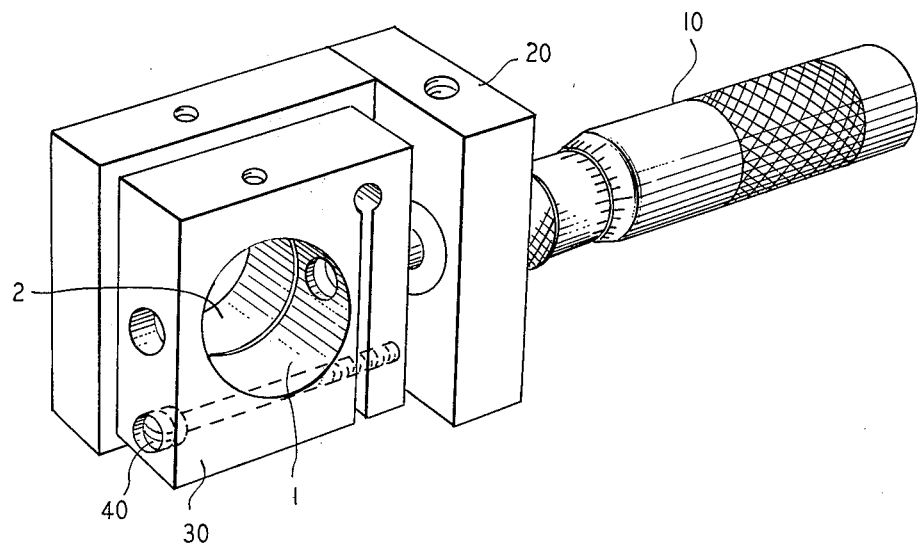
FIGS. 1 and 2 show in pictorial form a variable attenuator constructed according to a first embodiment of the present invention.

FIG. 1 shows a perspective view of an embodiment of the present invention in which micrometer 10 is mounted in support member 20. Grating 2 is mounted in a fixed position in support member 20. Support member 30 is fixed to the nonrotating spindle of micrometer 10. Phase grating 1 is fixed in member 30 so that the grooves in the face of grating 1 are in close proximity to the grooves in the face of grating 2 and the grooves in the face of grating 1 are substantially parallel to the grooves in the face of grating 2. Screw 40, in support member 30, allows for adjustment of grating 1 so that the grooves in the two gratings are held substantially parallel. As micrometer 10 is adjusted, support member 30 is translated with respect to support member 20. This translates grating 1 with respect to grating 2 while holding the grooves on both gratings substantially parallel and in close proximity.

Figure 2:
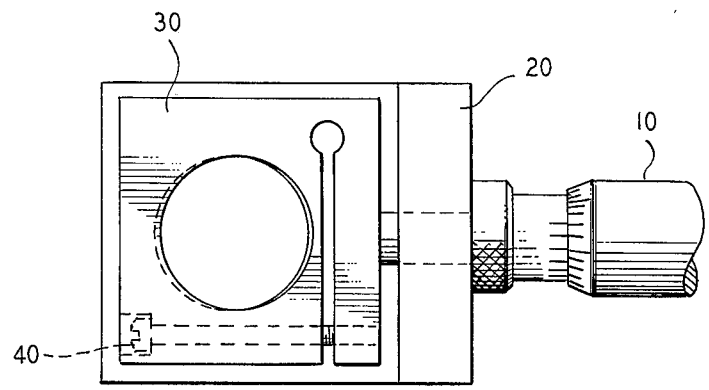

FIG. 2 shows a side view of the embodiment shown in FIG. 1.

A variable attenuator constructed according to the present invention is advantageous because it is resistant to high power radiation since the radiation attenuation is achieved by diffracting light out of the incident beam rather than by absorbing radiation from the incident beam. Furthermore, the beam will not be distorted or translated from its incident direction.

Although it is not required that the two phase gratings have the same groove width, depth and spacing, the theory of operation of the device can best be understood when referred to an embodiment wherein these parameters are substantially the same for both phase gratings.

Figure 3:
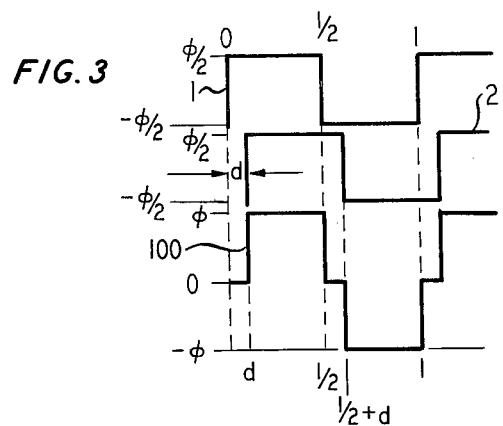
FIG. 3 shows a graph of the phase retardation of an apparatus constructed according to a first embodiment of the present invention where a second grating is displaced relative to a first grating, the phase retardation of the two gratings being combined over one period.

FIG. 3 shows the phase retardation of gratings 1 and 2 of the attenuator. Grating 2 is displaced from grating 1 by a small distance d, which displacement is taken perpendicular to the direction of the rectangular grooves. I have normalized the width of each groove on both grating 1 and 2 to be equal to one-half. Curve 100 in FIG. 3 represents the quantitative phase retardation resulting from the apparatus (the phase retardation of grating 1 from $0 \to \frac{1}{2}$ is $\Phi/2$ and the phase retardation of grating 1 from $\frac{1}{2} \to 1$ is $-\Phi/2$). The complex transmittance function of the configuration of the two gratings which is shown in FIG. 3 is:

$$T = \{1 + [e^{j\varphi} - 1]\mathrm{rect}((x - (\tfrac{1}{2} + d)/2)/(\tfrac{1}{2} - d)) + \qquad (1)$$
$$[e^{-j\varphi} - 1]\mathrm{rect}((x - (3/2 + d)/2)/(\tfrac{1}{2} - d))\}*\mathrm{comb}(x)$$

where $$\mathrm{rect}(y) = 1, \ |y| \leq \tfrac{1}{2}$$

0 otherwise $$\mathrm{comb}(y) = \sum_{n=-\infty}^{\infty} \delta(y - n).$$

The diffraction pattern generated by the two gratings is represented by the Fourier transform of the transmittance function T. This is given by:

$$F = \{\delta(0) + (\tfrac{1}{2} - d)e^{-j\pi(\tfrac{1}{2} + d)f}[e^{j\varphi} - 1]\mathrm{sinc} \\ (\tfrac{1}{2} - d)f + (\tfrac{1}{2} - d)e^{-j\pi(3/2 + d)f}[e^{-j\varphi} - 1]\mathrm{sinc} \\ (\tfrac{1}{2} - d)f\}*\mathrm{comb}(f) \qquad (2)$$

In order to find the amplitude of the radiation transmitted in the same direction as the incident radiation I look at the zero frequency component in the equation (2). This is given by:

$$Z = 1 + (\tfrac{1}{2} - d)(e^{j\varphi} - 1) + (\tfrac{1}{2} - d)(e^{-j\varphi} - 1) \qquad (3)$$

which reduces to:

$$Z = 2d + (1 - 2d)\cos\varphi \qquad (4)$$

The intensity of the undiffracted part of the transmitted radiation is obtained by multiplying Z by its complex conjugate to give:

$$I = 4d^2 + (1 - 2d)^2 \cos^2\varphi - 4d(1 - 2d)\cos\varphi \qquad (5)$$

In order to determine the condition which provides for zero amplitude in the undiffracted part of the transmitted radiation I set $Z = 0$ and solve equation (4) for the relative displacement, d, of the two gratings which provides this zero. I obtain $$d = 0.5\cos\psi/(\cos\psi - 1) \qquad (6)$$

Note that d is only allowed to vary from zero to one-half, i.e., $\cos\varphi < 0$. Therefore, $\varphi$ can take on values in the range $\pi/2 < \varphi < 3(\pi/2)$ plus any integer multiple of $2\pi$. When $\varphi$ is chosen to satisfy this condition, the transmission of the apparatus can always be varied between 0 and 100 percent.

$$\varphi = 2\pi\Delta L/\lambda \qquad (7)$$

where $\Delta n$ is the difference in the index of refraction between the grating material and the surrounding material (typically air), $\lambda$ is the wavelength of the incident radiation and L is the grating depth.

Figure 4:
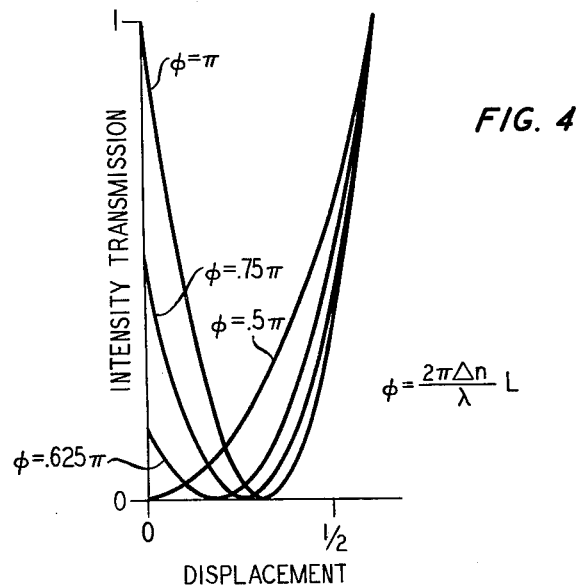
FIG. 4 shows the results of a calculation of the intensity of the undiffracted transmitted radiation for an apparatus constructed according to a first embodiment of the present invention.

FIG. 4 shows the results of calculations of the intensity, using equation (5), of the undiffracted part of the transmitted beam for various values of the phase retardation of a groove in a phase grating.

Figure 5:
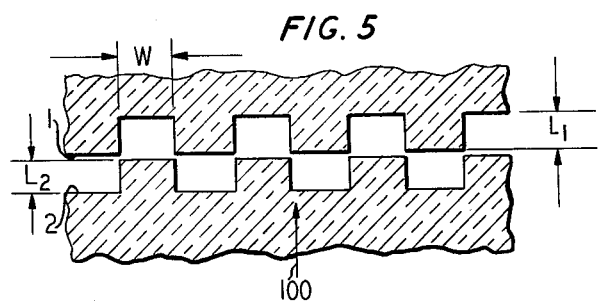
FIG. 5 shows in diagrammatic form two phase gratings in face-to-face confrontation where the transmittance is 100 percent for grooves having equal depth.

FIG. 5 shows a cross-section of the attenuator taken perpendicular to the direction of the grooves. Grating 1 and grating 2 are aligned so that the total transmittance of radiation through the apparatus along a direction indicated by arrow 100 is maximized. This position produces a maximum transmittance for all wavelengths of radiation.

Figure 6:
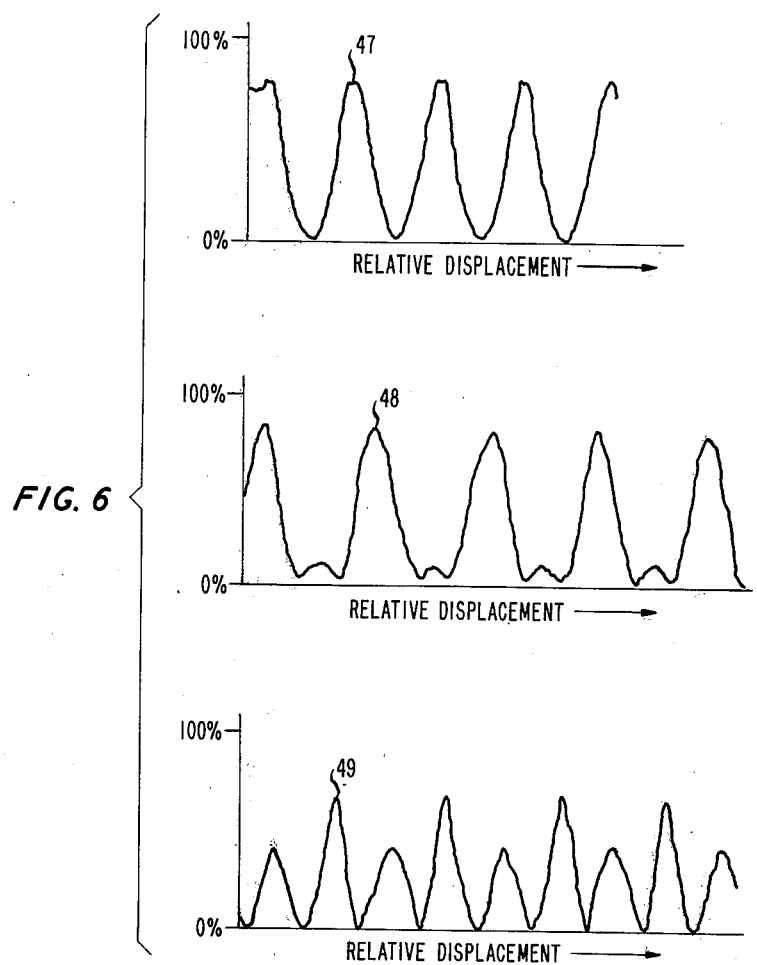
FIG. 6 shows a graph of the transmitted radiation which results from applying light of three different wavelengths to an apparatus constructed according to a first embodiment of the present invention using gratings with 3500 Å deep grooves.

FIG. 6 shows the portion of an incident beam of laser radiation that is transmitted as undiffracted radiation by a pair of phase gratings for three different laser sources as the relative displacement of the gratings is varied: curve 47 shows the result for 6328 Å He:Ne laser radiation, curve 48 shows the result for 5145 Å Ar+ laser radiation, and curve 49 shows the result for 3215 Å He:Cd laser radiation. The pair was formed by processing two substrates in an identical fashion; each having grooves which were 3500 Å deep. Curves 47, 48 and 49 in FIG. 6 display the transmitted radiation as one grating was displaced with respect to the other for the three respective input wavelengths.

As was discussed hereinabove, equation (6) shows that if $\Phi$ is held in the range $\pi/2 < \Phi < 3\pi/2$ there will be one value of the displacement of the gratings at which the transmission of the undiffracted beam will be zero. Using equation (7) we find that this condition may be expressed as follows:

$$\lambda/(4\Delta n) < L < 3\lambda/(4\Delta n). \qquad (8)$$

Thus, as long as the depth of the groove, L, satisfies this relationship, a value of the displacement of the two gratings will be found which corresponds to zero transmittance.

It should be clear, however, that if the depth of the grating were in the middle range of equation (8), then the tolerance involved in fabricating the gratings is relaxed because slight variations in groove depth L would still leave the value within the appropriate limits of equation (8).

Let us look back at the attenuator for the 6328 Å radiation in light of the above knowledge. The optimal grating depth at the center of the interval of equation (8) should be equal to $6328/2\Delta n$. The grating I used was fabricated from fused silica having a $\Delta n$ equal to 0.46. Thus, the optimal depth of a groove should be 6878 Å. However, as is shown by the ability of the apparatus to go from a extinction of 3 percent to a transmission of over 80 percent with a groove depth of 3500 Å, the apparatus constructed according to the present invention is extremely tolerant of deviations from optimal depth for a particular wavelength. Note further, that a similar extinction ratio is obtained at each of the other input wavelengths.

By recasting equation (8) in the following form:

$$c/(4L\Delta n) < \omega < 3c/(4L\Delta n) \tag{9}$$

I find that for a given groove depth L and a given grating material there is a spread of frequencies from $\omega_O \rightarrow 3\omega_O$, where $\omega_O = c/(4L\Delta n)$ for which the apparatus can provide an attenuation down to almost total extinction. Thus, a single apparatus constructed according to the present invention may be used for attenuation throughout the entire visible spectrum.

The gratings used for constructing the apparatus shown in FIGS. 1 and 2 were produced by sputter etching a fused silica substrate. A master mask consisting of 20 micron lines with 20 micron spaces was fabricated using an electron beam exposure system (EBES). A negative type of electron resist was mounted on a substrate and exposed to an electron beam. Development left the resist material intact where the beam had been incident. After development, the residual resist was used as a mask for wet-etching a similar pattern on a 600-800 Å thick opaque layer of chromium, which chromium layer had been deposited on a transparent glass plate. The etching removed all the chromium which was not directly under the residual electron resist. When the wet-etching was completed the resist was chemically removed and the remaining chromium film was ready to be used as a photolithographic master.

A fused silica substrate was cleaned and dried. A photoresist material was applied and the photolithograph master was positioned directly onto the substrate. This combination was exposed and developed. A 400 Å film of aluminum was now evaporated onto the substrate. This was followed by an 800-900 Å film of titanium. The excess metal was lifted off by soaking and spraying the substrate with acetone. This step in the process left the entire substrate covered with titanium material except where the grooves were to be etched. The titanium patterned substrates were placed in a Materials Research Corporation Model 8612 sputter-etch system. The system was evacuated into the $10^{-7}$ range. The gate valve was partially closed and the bell jar was backfilled to 6 μm with a 20 percent oxygen, 80 percent argon gas mixture. The 20 percent oxygen in the mixture will oxidize the titanium surface and thereby reduce the sputtering rate of the titanium mask. The space between the anode and the substrate platform was adjusted to 5.2 cm, and 200 watts of r.f. power was applied. These conditions will etch fused silica at an approximate rate of 30 Å per minute. After the appropriate etch time the sputter-etching was discontinued and the samples removed. A surface profile measurement was performed to determine the depth of the grooves. After the depth of the grooves was determined the titanium/aluminum mask was removed by submerging the substrates in a dilute 5 percent hydrofluoric acid solution for 1-2 seconds. The substrate was then rinsed and the aluminum and remaining titanium metal was etched off using sodium hydroxide.

A last step merely required mounting the gratings formed by the procedure described hereinabove into an appropriate mounting. An example of a mounting suitable for use is shown in FIGS. 1 and 2.

I would also like to note that the apparatus will also be tolerant of slight deviations of the gratings from parallel alignment of the grooves and of the faces. If the width of a groove is given by W and the length of a groove on a grating is given by D then angular deviations from parallel which are substantially less than W/D are acceptable.

Figure 7:
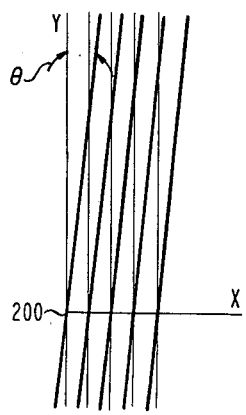
FIG. 7 shows in diagrammatic form the orientation of two phase gratings in a second embodiment of the present invention.

In a second embodiment, the gratings are fixed relative to each other in an assembly. The grooves are oriented so that they make a small angle, θ, with respect to one another, as shown in FIG. 7. This embodiment does not require relative movement between the two gratings. If the gratings are displaced from the origin, 200, in FIG. 7, by an amount d=y sin θ, where y is measured along the Y axis in FIG. 7, the light which passes through different positions of y are attenuated by different amounts. Since it is desirable that the attenuation be substantially uniform across the light beam diameter the condition on θ is given by $\theta << W/$(diameter) where W is the width of a single grating groove. The assembly is mounted so that the position at which the beam impinges may be changed to vary the attenuation.

In a third embodiment, the gratings are fixed relative to each other in an assembly. The grooves are parallel but the gratings have slightly different periods. Thus, if two gratings have groove widths W and W−ΔW and are undisplaced at X=0 (X is measured perpendicular to the grooves); the displacement as a function of X is d=XΔW/W. Thus, a variable attenuator is obtained by passing the beam pass through different positions of X. In order to assure that the attenuation be substantially uniform across the beam ΔW/W should satisfy the following condition $\Delta W/W << W/$(diameter). The assembly is mounted so that the position at which the beam impinges may be changed to vary the attenuation.

What is claimed is:

1. A variable attenuator for laser or collimated radiation which comprises:
   a first phase grating (1) having first rectangular grooves disposed on a substrate face in a parallel pattern of straight lines, said first rectangular grooves having a first depth, a first width and said first rectangular grooves being disposed at a first spacing from one another;
   a second phase grating (2) having second rectangular grooves disposed on a substrate face in a parallel pattern of straight lines, said second rectangular grooves having a second depth, a second width and said second rectangular grooves being disposed at a second spacing from one another; and
   mounting means (10, 20, 30) for holding said first phase grating and said second phase grating at a predetermined orientation;
   characterized in that:
   said predetermined orientation is such that said first rectangular grooves and said second rectangular grooves are substantially parallel and the face of said first phase grating is substantially parallel and adjacent to the face of said second phase grating;
   said mounting means slidably holds said first phase grating and said second phase grating for translating said gratings with respect to each other while maintaining said predetermined orientation; and
   said first depth and said second depth are equal to $L = (\lambda\phi/2\pi\Delta n)$ where λ is the wavelength of said laser or collimated radiation, Δn is the difference in the index of refraction between the material of said first and second phase gratings and the medium surrounding said gratings, and φ is in the range of $\pi/2 < \phi < 3\pi/2$ plus any integer multiple of $2\pi$.

2. A variable attenuator as defined in claim 1 wherein said second rectangular grooves have a width substantially the same as said first width and said second rectangular grooves being disposed at a spacing substantially the same as said first spacing.

3. A variable attenuator as defined in claim 2 in which said phase grating comprises fused silica.

4. Apparatus for use with laser or collimated radiation having a beam diameter b which comprises:
   a first phase grating having first rectangular grooves disposed on a substrate face in a parallel pattern of straight lines;
   a second phase grating having second rectangular grooves disposed on a substrate face in a parallel pattern of straight lines; and
   mounting means for holding said first phase grating and said second phase grating at a predetermined orientation
   characterized in that said predetermined orientation is such that said first rectangular grooves are oriented at a small predetermined angle $\theta$ relative to said second rectangular grooves and the face of said first phase grating is substantially parallel and adjacent to the face of said second phase grating, where $\theta$ is much less than the ratio of the width of said first rectangular grooves and said beam diameter b; and
   said first and second rectangular grooves have a depth substantially equal to $L=(\lambda\phi/2\pi\Delta n)$ where $\lambda$ is a wavelength in said laser or collimated radiation, $\Delta n$ is the difference in the index of refraction between the material of said first and second phase gratings and the medium surrounding said gratings, and $\phi$ is in the range of $\pi/2<\phi<3\pi/2$ plus any integer multiple of $2\pi$.

5. Apparatus for use with laser or collimated radiation which comprises:
   a first phase grating having first rectangular grooves having a first period, said grooves being disposed on a substrate face in a parallel pattern of straight lines;
   a second phase grating having second rectangular grooves having a second period, said grooves being disposed on a substrate face in a parallel pattern of straight lines; and
   mounting means for holding said first plate grating and said second phase grating at a predetermined orientation;
   characterized in that;
   said first period and said second period differ; and
   said predetermined orientation is such that said first rectangular grooves and said second rectangular grooves are substantially parallel and the face of said first phase grating is substantially parallel and adjacent to the face of said second phase grating; and
   said first and second rectangular grooves have a depth substantially equal to $L=(\lambda\phi/2\lambda\Delta n)$ were $\lambda$ is a wavelength in said laser or collimated radiation, $\Delta n$ is the difference in the index of refraction between the material of said first and second phase gratings and the medium surrounding said gratings, and $\phi$ is in the range of $\pi/2<\phi<3\pi/2$ plus any integer multiple of $2\pi$.

6. Apparatus as defined in claims 1, 4 or 5 wherein the depth L is approximately equal to $(\lambda_O/2\Delta n)$ where $\lambda_O$ is equal to the wavelength of said laser or collimated radiation.

7. Apparatus as defined in claims 1, 4 or 5 wherein the depth L is substantially equal to $(c/4\omega_O\Delta n)$ where $\omega_O$ is equal to the lowest frequency in a range of frequencies in said laser or collimated radiation.

* * * * *